United States Patent Office 3,172,855
Patented Mar. 9, 1965

3,172,855
BARIUM-CALCIUM SULFONATE COMPLEXES AND LUBRICATING COMPOSITIONS CONTAINING SAME
James D. Rogers and Carl W. Stuebe, Cleveland, Ohio, assignors to The Lubrizol Corporation, Wickliffe, Ohio, a corporation of Ohio
No Drawing. Filed Apr. 13, 1962, Ser. No. 187,187
18 Claims. (Cl. 252—32.7)

This invention relates to novel carbonated barium- and calcium-containing sulfonate complexes of unusually high metal content and to a method for their preparation. In a more particular sense, it relates to oil-soluble carbonated barium-calcium sulfonate complexes having metal ratios of at least about 10.

It is known in the sulfonate art, as exemplified by Griesinger U.S. Patent 2,402,325, Campbell et al. U.S. Patent 2,485,861, and Mertes U.S. Patent 2,501,731, that a normal sulfonate or a sulfonic acid, particularly one derived from petroleum oils, can be combined with substantially more salt-forming reagent or inorganic metal compound than is theoretically necessary to replace the acidic hydrogens of the acid. Essentially, the technique for obtaining such materials involves the use of a large excess of neutralizing agent or inorganic metal compound with either the normal sulfonate or sulfonic acid and water, and then dehydrating the process mass at elevated temperatures. While the exact composition of the product is not known, some researchers believe, on the basis of the Tyndall effect, that the excess metal present is due to a dispersion or colloidal suspension of the inorganic metal compound or neutralizing agent in the normal sulfonate. In any event, such compositions are known to possess a high metal content which cannot be explained in many instances by known basic salt structures.

Perhaps the simplest high metal content sulfonate complex which can be represented by a structural formula is

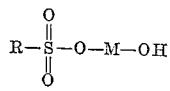

wherein M is a divalent metal and R is an organic radical. Such a sulfonate complex has a "metal ratio" of 2 (metal ratio being, for the purpose of this specification and appended claims, the ratio of total equivalents of metal in the sulfonate complex to equivalents of sulfonic acid anion therein). It has been determined that there is a quite definite upper limit to the amount of barium metal which can be held in a sulfonate complex by means of the above-described known processes. The greatest total amount of barium which can be thus incorporated in a mahogany sulfonate has been found to be equal to about 2.3 times the theoretical amount present in the normal mahogany sulfonate (i.e., a metal ratio of about 2.3).

A more recent advance in the production of high metal ratio sulfonate complexes is shown in Asseff et al. U.S. Patent Nos. 2,617,049; 2,616,924; 2,616,925; 2,616,911; 2,616,904; 2,616,905; and 2,616,906. In these patents, there is described a process of preparing complexes by combining an acidic organic compound (especially a sulfonic acid) and/or a salt thereof, a compound known as a promoter (principally a phenolic compound), an inorganic metal compound, and water; and then removing substantially all of the water at elevated temperatures. The complexes obtained by such a process contain substantially more metal in combination than is possible by the techniques disclosed and claimed in the patents to Mertes, Campbell et al., and Griesinger. For example, in U.S. Patent 2,617,049, which deals with carbonated barium sulfonate complexes that find application as starting materials for the carbonated barium-calcium sulfonate complexes of the present invention, it is shown that oil-soluble sulfonate complexes having metal ratios as high as about 7 may be prepared.

A still further advance is described in Asseff et al. U.S. Patent 2,695,910, which describes a process for preparing oil-soluble metal sulfonate complexes or "super-based salts" having metal ratios up to a maximum of about 9.3.

It has now been discovered that certain carbonated barium sulfonate complexes may be converted by means of a convenient and inexpensive process to novel, oil-soluble, carbonated barium-calcium sulfonate complexes having unusually high metal ratios, i.e., from about 10 to about 30 or more.

It is an object, therefore, of this invention to provide a process for the preparation of oil-soluble, carbonated barium-calcium sulfonate complexes characterized by metal ratios of at least about 10.

Another object is to provide novel, oil-soluble, carbonated barium-calcium sulfonate complexes which contain substantially more metal than known sulfonate complexes.

Yet another object is to provide lubricants containing the aforesaid carbonated barium-calcium sulfonate complexes.

These and other objects are achieved in accordance with the present invention by means of a process which comprises:

Preparing and mixing a mass in which, at 50° C., at least 50 percent of the components are in the liquid state, and in which mass the active components consist of:

A. A sulfonate selected from the group consisting of oil-soluble sulfonic acids having a total of at least about 15 carbon atoms and the barium salts thereof;
B. A phenolic compound selected from the group consisting of phenols and the barium salts thereof;

the equivalents of A:B being in the range from about 1:10 to about 10:1;

C. A barium base, in an amount such that there is present in the mass a total of at least about 3 equivalents of barium per equivalent of A, and
D. Water, in an amount equal to at least about one-tenth mole per mole of C;

maintaining the mass at a temperature and for a period of time sufficient to drive off substantially all water which may be present and form a barium sulfonate complex; treating said barium sulfonate complex with carbon dioxide in an amount sufficient to liberate a substantial proportion of said phenol of B; mixing said carbon dioxide-treated barium sulfonate complex with:

E. A calcium base, in an amount such that there is present in the mass a total of at least about 10 equivalents of barium and calcium per equivalent of A;
F. A lower aliphatic monohydric alcohol in the amount of at least about 5 percent by weight of said carbon dioxide-treated barium sulfonate complex; and optionally,
G. A minor amount of a calcium halide;

and then treating the mixture with carbon dioxide and heating it to drive off substantially all the alcohol and any water present.

The carbonated barium sulfonate complexes used as starting materials for the hereindescribed carbonated barium-calcium sulfonate complexes are prepared as set forth above from components A–D, inclusive. Their preparation is also described in detail in Asseff et al. U.S. Patent 2,617,049 and, in the interest of brievity, it is intended that the disclosure of the said Asseff et al.

patent be considered as forming a part of the present specification.

COMPONENT A

The oil-soluble barium sulfonates and/or sulfonic acids which comprise this component can be of the cyclic or aliphatic type. The cyclic compounds include the mono- or poly-nuclear aromatic or cycloaliphatic compounds.

The oil-soluble sulfonates can be represented for the most part by the following formulas:

(I) $[R_x-T-(SO_3)_y]_zM_b$ (II) $[R'-(SO_3)_a]_dM_b$

In the above formulas, M is either barium or hydrogen; T is a cyclic nucleus such as, for example, benzene, naphthalene, anthracene, phenanthrene, diphenylene oxide, thianthrene, phenothioxine, diphenylene sulfide, phenothiazine, diphenyl oxide, diphenyl sulfide, diphenyl amine, cyclohexane, petroleum naphthenes, decahydronaphthalene, cyclopentane, etc.; R is an aliphatic group such as alkyl, alkenyl, alkoxy, alkoxyalkyl, carboalkoxy-alkyl, etc.; $x$ is at least 1, and $R_x$—T contains a total of at least about 15 carbon atoms. R' in Formula II is an aliphatic radical containing at least about 15 carbon atoms and M is likewise either barium or hydrogen. Examples of types of the R' radical are alkyl, alkenyl, alkoxyalkyl, carboalkoxyalkyl, etc. Specific examples of R' are petrolatum, saturated and unsaturated paraffin wax, and polyolefins, including polymerized $C_2$, $C_3$, $C_4$, $C_5$, $C_6$, etc., olefins containing from about 15 to 7000 or more carbon atoms. The groups T, R, and R' in the above formulas can also contain other inorganic or organic substituents in addition to those enumerated above such as, for example, hydroxy, mercapto, halogen, nitro, amino, nitroso, sulfide, etc.

In Formula I, $x$, $y$, and $z$ and $b$ are at least 1, and likewise in Formula II, $a$, $b$, and $d$ are at least 1.

The following are specific examples of oil-soluble sulfonic acids coming within the scope of Formulas I and II above, and it is to be understood that such examples serve also to illustrate the barium salts of such sulfonic acids. In other words, for every sulfonic acid enumerated it is intended that the corresponding barium salt thereof is also illustrated.

Such sulfonic acids are mahogany sulfonic acids (obtained as by-products from the manufacture of petroleum white oils); bright-stock sulfonic acids; sulfonic acids derived from lubricating oil fractions having a Saybolt viscosity from about 100 seconds at 100° F. to about 200 seconds at 210° F.; petrolatum sulfonic acids; mono- and poly-wax substituted sulfonic and polysulfonic acids of, e.g., naphthalene, phenol, diphenyl ether, naphthalene disulfide, diphenyl amine, thiophene, alpha-chloronaphthalene, etc.; other substituted sulfonic acids such as cetyl chlorobenzene sulfonic acids, cetylphenol mono-sulfide sulfonic acids, cetoxy caprylbenzene sulfonic acids, dicetylthianthrene disulfonic acid, dilauryl beta-naphthyl sulfonic acids, dicapryl nitronaphtalene sulfonic acids, and alkaryl sulfonic acids such as dodecylbenzene "bottoms" sulfonic acids (i.e., those acids derived from benzene which has been alkylated with propylene tetramers or isobutene trimers to introduce one, two, three or more branched-chain $C_{12}$ substituents on the benzene ring. Dodecylbenzene bottoms, principally mixtures of mono- and di-dodecyl benzenes, are available as by-products from the manufacture of household detergents) and mono- and poly-tridecyl benzenes; aliphatic sulfonic acids such as paraffin wax sulfonic acids, unsaturated paraffin wax sulfonic acids, hydroxy-substituted paraffin wax sulfonic acids, hexapropylene sulfonic acids, tetra-amylene sulfonic acids, polyisobutene sulfonic acids wherein the polyisobutene contains from 20 to 7000 or more carbon atoms, chloro-substituted paraffin wax sulfonic acids, nitro-paraffin wax sulphonic acids, etc.; cycloaliphatic sulfonic acids such as petroleum naphthene sulfonic acids, cetylcyclopentyl sulfonic acids, laurylcyclohexyl sulfonic acids, bis-(diisobutyl)cyclohexyl sulfonic acids, mono- or poly-wax substituted cyclohexyl sulfonic acids, etc. Additional examples of oil-soluble sulfonic acids and/or barium salts thereof which can be used as component A herein are disclosed in the following U.S. Patents: 2,174,110; 2,174,506; 2,174,508; 2,193,824; 2,197,800; 2,202,791; 2,212,786; 2,213,360; 2,228,598; 2,233,676; 2,239,974; 2,263,312; 2,276,090; 2,276,097; 2,315,514; 2,319,121; 2,321,022; 2,333,568; 2,333,788; 2,335,259; 2,337,552; 2,346,568; 2,366,027; 2,374,193; and 2,383,319.

With respect to the sulfonic acids or barium salts thereof, it is intended herein to employ the terms "petroleum sulfonic acids" or "barium petroleum sulfonates" to cover all sulfonic acids or the barium salts thereof derived from petroleum products.

However, it is to be understood that the sulfonic acids and barium salts enumerated above are not all equivalent for the purposes of the present invention because, under certain conditions, some are more effective than others.

COMPONENT B

As indicated, this reagent is a phenolic compound selected from the group consisting of phenols and the barium salts thereof. For the purpose of this specification and the appended claims, it should be understood that the term "phenolic compound" includes those compounds in which at least one hydroxyl group or —OBa/2 group is directly attached to a benzenoid carbon atom, and which compounds may or may not contain other substituent groups. Likewise, the terms "a phenol" or "phenols" refer to those compounds in which at least one hydroxyl group is attached to a benzenoid carbon atom, but which compounds do not contain a —OBa/2 group, although they may contain other substituent groups. To illustrate the wide variety of phenolic compounds which can be employed as component B, the following specific examples are presented. It is to be understood that while only the phenols are illustrated, it is intended that the barium salts thereof be included as specific examples.

Useful as component B are phenol; alkylated and cycloalkylated phenols containing from 1 to 150 or more carbon atoms such as, for example, ortho-, meta-, and para-cresols, xylenols, para-ethylphenol, ortho, para-diethylphenol, n-propylphenol, para-isopropylphenol, di-isopropylphenol, n-butylphenol, para-tertiary butylphenol, n-amylphenol, para-tertiary amylphenol, para-cyclopentyl-phenol, cyclohexylphenol, methylcyclohexylphenol, secondary-hexylphenol, heptylphenol, diisobutylphenol, 3,5,5-trimethyl-n-hexylphenol, n-decylphenol, cetylphenol, wax-alkylated phenol, polyisobutene-substituted phenol in which the polyisobutene substituent contains from about 20 to about 150 carbon atoms, etc.; aryl substituted phenols such as phenylphenol, diphenylphenol, and naphthylphenol; polyhydroxy aromatic compounds such as alizarin, quinizarin, hydroquinone, catechol, pyrogallol, etc.; monohydroxy naphthalenes such as alpha-naphthol and beta-naphthol; polyhydroxy naphthalenes such as naphthohydroquinone and naphthoresorcinol; alkylated polyhydroxy aromatic compounds such as octylcatechol and mono-(triisobutyl)pyrogallol; and substituted phenols such as paranitrophenol, picric acid, ortho-chlorophenol, tertiary-butyl chlorophenols, para-nitro ortho-chloro-phenol, para-aminophenol, etc. In most instances the phenolic compound will be a mono-alkylphenol containing from about 4 to about 12 carbon atoms in the alkyl group. Thus, commercially available mono-alkylphenols such as para-tertiary butylphenol, heptylphenol, and di-isobutylphenol (i.e., tertiary-octylphenol) most often find use as component B.

COMPONENT C

This component, the barium base, is generally a basic-ally-reacting inorganic barium compound such as barium oxide, barium hydroxide, barium sulfide, barium hydrosulfide, barium amide, barium carbide, barium hydride, barium peroxide, and the like. In some instances, however, it is desirable to employ an alcoholate such as barium methylate or barium ethylate, etc., or a barium alkyl carbonate such as is obtained from the reaction of barium hydroxide, methanol, and carbon dioxide (cf. Dumas and Peligot, Annalen, volume 35, page 283). If desired, mixtures of two or more barium bases may be employed such as a mixture of about equal parts by weight of barium oxide and barium hydroxide. In most cases, however, barium oxide or barium hydroxide will be the barium base.

COMPONENT E

Component E, the calcium base, is usually a basically-reacting inorganic calcium compound such as calcium oxide, calcium hydroxide, calcium sulfide, calcium hydrosulfide, calcium amide, calcium carbide, calcium hydride, calcium peroxide, calcium nitride, and the like. It is also desirable, in some instances, to use a calcium alcoholate such as calcium methylate, calcium ethylate, etc., or a calcium alkyl carbonate such as calcium methyl carbonate. It is to be understood that mixtures of two or more of any of the above calcium bases may be employed as component E. Generally, however, this component will be either calcium oxide or calcium hydroxide.

COMPONENT F

The lower aliphatic monohydric alcohol which serves as this component contains from 1 to about 4 carbon atoms and it is, in most instances, a lower alkanol such as methanol, ethanol, n-propanol, isopropanol, n-butanol, or isobutanol. If desired, substituents such as nitro, nitroso, amino, ether, sulfide, halogen, etc., may also be present. By means of its low cost, commercial availability, volatility (i.e., it is readily distillable from the herein described process mass), and pronounced catalytic effect, methanol is particularly preferred.

COMPONENT G

This component, the calcium halide, is optionally but preferably present in the process mass of this invention. It has been found that a minor amount of calcium halide (generally 0.05–1 percent by weight of the carbonated barium sulfonate complex although more can be used if desired without adverse effect) exerts a marked catalytic effect on the incorporation of calcium in the final carbonated barium-calcium sulfonate complex; that is, higher metal ratios can be realized through its use. Calcium halides useful for the purpose include principally calcium chloride, calcium bromide, and calcium iodide. Ordinarily, calcium chloride is preferred in view of its low cost, availability, and effectiveness as a catalyst for the herein-described process. The calcium halide is most conveniently introduced into the process mass as a solution thereof in water and/or a water-soluble alcohol such as methanol or ethanol. Such solution will generally contain from 10 to 75 percent by weight of the calcium halide.

In the ordinary practice of this invention, the sulfonate starting material, the phenolic compound, and the barium base are introduced into a reaction vessel. Generally, the sulfonate material is a solution of 20–75 percent by weight of an oil-soluble normal barium sulfonate in a solvent such as a low-viscosity mineral oil or a volatile petroleum hydrocarbon solvent. The ratio of equivalents of sulfonate to phenolic compound is, respectively, within the range from about 1:10 to about 10:1 and more often from about 1:1 to about 4:1. Water, in the amount of at least one-tenth mole and generally from about 5 to about 75 moles per mole of barium base, is also present in the process mass. This water can be present in one or more of the other components, e.g., a "wet" sulfonate or phenolic compound, water of hydration in the barium base, etc., or it can be water which is added separately to the process mass. It can also comprise "chemically combined" water such as is present in barium hydroxide $(BaO+H_2O \rightarrow Ba(OH)_2)$. Thereafter, the whole is mixed and heated to a temperature within the range from about 100° to 250° C., generally 120–175° C., until substantially all the water present has been removed. If desired, subatmospheric pressures can be used to assist in the removal of water. Carbon dioxide is then introduced into the heated process mass to liberate at least a portion of the phenol, all or most of which is chemically bound in the form of a barium phenolate prior to the introduction of carbon dioxide. Ordinarily, the carbon dioxide is introduced until the titratable basicity of the process mass is substantially reduced. In most instances, the carbonation is continued until the process mass shows a basic number less than about 20 according to ASTM procedure D974–58T. If desired, sufficient carbon dioxide may be introduced to give a product having a slight acid titer (i.e., all the phenol liberated from the phenolate and all the barium base converted to barium carbonate). The process mass is optionally filtered and filtration, if employed, may be carried out before or after the carbon dioxide treatment step. The process mass is preferably carbonated prior to filtration because this sequence of steps has been found to result in the incorporation of more barium in the sulfonate complex. The calcium base, the lower aliphatic monohydric alcohol in the amount of at least about 5 percent and preferably 5 to 100 percent by weight of the carbonated barium sulfonate complex, and, optionally, the calcium halide are then added to the process mass (the latter having cooled sufficiently to avoid premature volatilization of the alcohol). Then carbon dioxide is introduced and the whole is heated to a temperature within the range from about 100°–250° C., generally 120°–175° C., until substantially all the alcohol and any water present have been removed. Subatmospheric pressures can be used, if desired, to assist in the removal of alcohol and water. The material in the flask comprises the carbonated barium-calcium sulfonate complex of this invention. For most applications, it is preferred to filter the crude complex so that it will be entirely free from oil-insoluble contaminants. In some cases, however, it is preferred to employ the crude, unfiltered complex.

The following examples are presented to illustrate specific modes of carrying out the process of this invention. They are intended for purposes of illustration only and are not to be construed as limiting the scope of the invention, except as the latter is defined by the appended claims. Examples 1 through 13, inclusive, illustrate the preparation of carbon dioxide-treated barium sulfonate complexes which are precursors of the carbonated barium-calcium sulfonate complexes of this invention. Examples 14 through 18, inclusive, illustrate the conversion of said sulfonate complexes to the desired carbonated barium-calcium sulfonate complexes having metal ratios of at least about 10. In the examples, all parts and percentages are by weight unless otherwise specified.

Example 1

863 parts of "wet" barium mahogany sulfonate (a 65 percent solution in SAE 10 mineral oil) containing about 12 percent of water and 10 percent of sulfate ash, 44 parts of heptylphenol (ratio of equivalents of sulfonate to phenolic compound is 3.32:1), and 227.9 parts of barium oxide are introduced into a reaction vessel. The whole is then heated to 140°–150° C. over a period of 5 hours and treated with carbon dioxide at that temperature for about 3 hours, at the end of which time the process mass is substantially neutral. Filtration yields the desired carbonated barium sulfonate complex, to which additional SAE 10 mineral oil is added to reduce the sulfate ash to a value of about 25 percent. The thus diluted carbonated barium sulfonate complex contains about 48 percent of oil and shows the following analyses.

Basic number _____ 0.5
Percent sulfate ash _____ 25.1
Metal ratio _____ 4.9

Example 2

1,250 parts of "wet" barium mahogany sulfonate (a 65 percent solution in SAE 10 mineral oil) containing about 12 percent of water and 10 percent of sulfate ash, 115.5 parts of heptylphenol, and 564.5 parts of barium oxide are heated slowly to 140–150° C. over a period of about 3.5 hours. The ratio of equivalents of sulfonate to phenolic compound in the process mass is 1.7:1. The mass is then blown with carbon dioxide for 5 hours until a substantially neutral titer is obtained. Filtration yields the purified, carbonated barium sulfonate complex, which is diluted with SAE 10 mineral oil to yield a product containing about 38.5 percent sulfate ash. The thus diluted complex contains about 37 percent of oil and shows the following analyses.

Basic number _____ 0.9
Percent sulfate ash _____ 38.5
Metal ratio _____ 7.5

Example 3

1,980 grams (1.28 equivalents) of the barium salt of petrolatum sulfonic acid (derived from Pennsylvania amber petrolatum) and 132 grams (0.83 equivalent) of para-tertiary butylphenol (ratio of equivalents of sulfonate to phenolic compound is 1.54:1) are introduced into a reaction vessel and heated to 95° C. To this mixture is added a barium oxide slurry containing 417 grams (5.4 equivalents) of barium oxide and 1,100 grams of water, and the whole is heated for about 1 hour at the reflux temperature. Then the temperature is slowly raised to 150–160° C. and maintained there for 1 hour to remove substantially all of the water. The process mass is then filtered and treated with carbon dioxide at 140°–150° C. until it shows a basic number of about 5. The carbonated barium sulfonate complex is a light-brown viscous liquid showing the following analyses.

Basic number _____ 5
Percent sulfate ash _____ 13.96
Metal ratio _____ 1.70

Example 4

1000 grams (1.12 equivalents) of the barium salt of unsaturated paraffin wax sulfonic acid containing 13.1 percent of sulfate ash is mixed with 455 grams of SAE 10 mineral oil and 109.5 grams (0.73 equivalent) of para-tertiary butylphenol (ratio of equivalents of sulfonate to phenolic compound is 1.54:1) in a reaction vessel and heated to about 95° C. To this mixture is added a slurry of 269 grams (3.5 equivalents) of barium oxide and 920 grams of water. The whole is then heated at about 100° C. for 1 hour. The temperature of the process mass is slowly raised to about 150° C. and held there for 1 hour until substantially all of the water is removed. The barium sulfonate complex is filtered and then treated with carbon dioxide at 130°–150° C. until it shows a basic number of 10. The carbonated barium sulfonate complex shows the following analyses.

Basic number _____ 10
Percent sulfate ash _____ 26.5
Metal ratio _____ 2.49

Example 5

1000 grams (0.73 equivalent) of the barium salt of mono-paraffin wax substituted naphthalene sulfonic acid containing 8.63 percent of sulfate ash is mixed with 445 grams of SAE 10 mineral oil and 64.5 grams (0.43 equivalent) of para-tertiary butylphenol (ratio of equivalents of sulfonate to phenolic compound is 1.7:1) and heated to about 90° C. A slurry of barium oxide containing 203.5 grams of barium oxide and 543 grams of water is added and the mixture is heated for 2 hours at the reflux temperature. The process mass is then heated to 165° C. over a period of about 1 hour, filtered, and treated with carbon dioxide at 150° C. until it shows a basic number of about 4. The carbonated barium sulfonate complex shows the following analyses.

Basic number _____ 4
Percent sulfate ash _____ 17.9
Metal ratio _____ 2.37

Example 6

400 grams (0.28 equivalent) of the barium salt of mono-paraffin wax substituted naphthalene sulfonic acid disulfide containing 8.2 percent of sulfate ash and 27 grams (0.18 equivalent) of para-tertiary butylphenol (ratio of equivalents of sulfonate to phenolic compound is 1.54:1) are placed in a reaction vessel and heated to 90° C. A barium oxide slurry containing 66.5 grams (0.86 equivalent) of barium oxide and 180 grams of water is added to the process mass and the whole is refluxed for about 1 hour. The temperature is then slowly raised to about 160° C. over a period of about 4 hours and held there for 1.5 hours until substantially all the water is removed. The process mass is filtered and then treated with carbon dioxide at 140° C. until it shows a basic number of 1.5. The carbonated barium sulfonate complex shows the following analyses.

Basic number _____ 1.5
Percent sulfate ash _____ 24.3
Metal ratio _____ 3.50

Example 7

1,500 grams (1.0 equivalent) of a 30 percent oil solution of barium mahogany sulfonate having a sulfate ash of 7.6 percent, 93 grams (0.685 equivalent) of isopropylphenol (ratio of equivalents of sulfonate to phenolic compound is 1.45:1), and 670 grams of water are placed in a flask and heated to 60° C. 250 grams (3.25 equivalents) of barium oxide is then added and the whole is heated at 100° C. for 1 hour and at 150° C. for 0.5 hour. The process mass is filtered and then treated with carbon dioxide at 120° C. until it shows a basic number of 6. The carbonated barium sulfonate complex shows the following analyses.

Basic number _____ 6
Percent sulfate ash _____ 25.95
Metal ratio _____ 3.88

Example 8

2,583 grams (1.69 equivalents) of a 30 percent oil solution of barium mahogany sulfonate having a sulfate ash of 7.6 percent, 144.2 grams (1.0 equivalent) of beta-naphthol, and 1,262 grams of water are mixed thoroughly in a reaction vessel. Then 472 grams (6.15 equivalents) of barium oxide is added over a period of 1 hour and the whole is heated for 1 hour at 100° C. The temperature is then raised to 150° C. and held there for about 1 hour. Prior to filtration, the process mass is blown with carbon dioxide for 75 minutes, at the end of which time the mass has a basic number of 0.8. The filtered, carbonated barium sulfonate complex shows the following analyses.

Basic number _____ [1] 4.88
Percent sulfate ash _____ 23.8
Metal ratio _____ 3.90

[1] Loss of carbon dioxide on filtration accounts for the slight rise in the basic number.

Example 9

1,530 grams (1.0 equivalent) of a 30 percent oil solution of barium mahogany sulfonate having 7.6 percent of sulfate ash, 129 grams (0.59 equivalent) of isononylphenol (ratio of equivalents of sulfonate to phenolic compound is 1.7:1), and 727 grams of water are thoroughly mixed in a reaction vessel. Then 271 grams (3.5 equivalents) of barium oxide is added and the whole is held at 100° C. for 1 hour. The temperature is then raised to 150–160° C. and held there for 1 hour. Prior to filtration, the process mass is blown with carbon dioxide at 150° C. until it is substantially neutral. The filtered, carbonated barium sulfonate complex shows the following analyses.

Basic number _____ 3.9
Percent sulfate ash _____ 25.0
Metal ratio _____ 4.17

*Example 10*

2,600 grams (1.7 equivalents) of a 30 percent oil solution of barium dodecylbenzene bottoms sulfonate, 215 grams (1.0 equivalent) of tertiary-butyl chlorophenol, 1,265 grams of water, and 459 grams (6 equivalents) of barium oxide are introduced into a reaction vessel. The temperature of the process mass is raised to 100° C. and held there for 1 hour. Then the temperature is raised to 150° C. and held there for 1 hour. Prior to filtration, the process mass is blown for 3 hours with carbon dioxide at 135°–145° C. until it is substantially neutral. The filtered, carbonated barium sulfonate complex shows the following analyses.

Basic number _____ 13.3
Percent sulfate ash _____ 25.45
Metal ratio _____ 4.38

*Example 11*

1,700 grams (1.11 equivalents) of a 30 percent oil solution of barium mahogany sulfonate containing 7.6 percent of sulfate ash is admixed with 105 grams (0.65 equivalent) of barium phenolate (ratio of equivalents of sulfonate to phenolic compound is 1.7:1) and 570 grams of water. The mixture is heated to 75°–100° C. whereupon 214 grams (2.8 equivalents) of barium oxide is added. The temperature of the whole is maintained at 100° C. for 1 hour and then raised slowly to 150° C. and held at this point for a period of about 1 hour. The process mass is filtered and then treated with carbon dioxide at 150° C. until it shows a substantially neutral titer. The carbonated barium sulfonate complex obtained shows the following analyses.

Basic number _____ 0.9
Percent sulfate ash _____ 21.4
Metal ratio _____ 3.23

*Example 12*

1,700 grams (1.11 equivalents) of a 30 percent oil solution of barium mahogany sulfonate having a sulfate ash of 7.6 percent is mixed with 134 grams (0.65 equivalent) of diisobutylphenol (ratio of equivalents of sulfonate to phenolic compound is 1.7:1) and heated to 70° C. 302 grams (3.9 equivalents) of barium oxide and 800 grams of water are then added and the whole is refluxed for about 1 hour. The temperature is then raised to 150° C. over a period of 1.75 hours and held at that level for about 1 hour. The process mass is then blown with carbon dioxide at a temperature of 150° C. and at a rate of 1,650 ml./minute for 38 minutes. The mixture is filtered to yield the desired carbonated barium sulfonate complex showing the following analyses.

Basic number _____ 5.05
Percent sulfate ash _____ 26.0
Metal ratio _____ 4.52

*Example 13*

2,280 grams (2.0 equivalents) of a 72.5 percent solution of barium Pennsylvania bright-stock sulfonate in SAE 10 mineral oil having a sulfate ash of 11.2 percent, 116 grams (0.602 equivalent) of heptylphenol (ratio of equivalents of sulfonate to phenolic compound is 3.32:1), 428 grams of SAE 10 mineral oil, 200 grams of water, and 604 grams (7.88 equivalents) of barium oxide are mixed at 70° C. The whole is heated to 150° C. over 1.7 hours and then carbon dioxide is introduced until the process mass is substantially neutral. After filtration, the carbonated barium sulfonate complex shows the following analyses.

Basic number _____ 2.0
Percent sulfate ash _____ 30.44
Metal ratio _____ 4.63

*Example 14*

1,800 grams of the carbonated barium sulfonate complex of Example 1, 390 grams of methanol, 6 grams of 50 percent aqueous calcium chloride, and 489 grams (13.2 equivalents) of calcium hydroxide are introduced into a flask and refluxed for 1 hour. Carbon dioxide is then introduced into the process mass at the rate of 2 cubic feet per hour while the whole is heated to about 150° C. to remove the alcohol and any water formed. Filtration of the process mass yields the desired carbonated barium-calcium sulfonate complex of this invention, which shows the following analyses.

Acid number _____ 1.0
Precent sulfate ash _____ 46.42
Percent barium _____ 11.36
Percent calcium _____ 7.73
Metal ratio _____ 17.4

*Example 15*

1,050 grams of the carbonated barium sulfonate complex of Example 2, 153 grams of methanol, and 276 grams of moist, hydrated lime (contains 6.0 equivalents of calcium hydroxide) are introduced into a flask and refluxed for 2 hours. Carbon dioxide is then introduced into the process mass at a rate of 2 cubic feet per hour while the temperature is raised to 150° C. to remove the alcohol and water. After the process mass has cooled it is diluted with an equal volume of benzene, filtered, and then stripped of benzene by heating to 150° C. The residue in the flask is the desired carbonated barium-calcium sulfonate complex, which shows the following analyses.

Basic number _____ 5.0
Percent sulfate ash _____ 50.76
Percent barium _____ 18.72
Percent calcium _____ 5.39
Metal ratio _____ 15.9

*Example 16*

An experiment is conducted in the same manner set forth in Example 15, except that 5 grams of a 50 percent aqueous solution of calcium chloride is added to the process mass when it is first mixed. It is observed that the process mass filters well without the use of benzene solvent (benzene or other solvent is required for filtration purposes in the procedure of Example 15). The filtered, carbonated barium-calcium sulfonate complex shows the following analyses.

Basic number _____ 10
Percent sulfate ash _____ 57.79
Percent barium _____ 18.01
Percent calcium _____ 7.86
Metal ratio _____ 19.1

In comparison with the procedure set forth in Example 15, it will also be noted that the calcium chloride catalyst employed here results in an increased metal ratio in the final carbonated barium-calcium sulfonate complex (the increase amounts of 3.2 metal ratio units).

Example 17

1,050 grams of the carbonated barium sulfonate complex of Example 2, 300 grams of SAE 10 mineral oil, 200 grams of methanol, 5 grams of 50 percent aqueous calcium chloride, and 333 grams (9.0 equivalents) of calcium hydroxide are processed in the same manner set forth in Example 14. The filtered, carbonated barium-calcium sulfonate complex shows the following analyses.

| | |
|---|---|
| Acid number | 0.3 |
| Percent sulfate ash | 44.32 |
| Percent barium | 14.87 |
| Percent calcium | 5.47 |
| Metal ratio | 19 |

Example 18

In the same manner set forth in Example 14, 1,750 grams of the carbonated barium sulfonate complex of Example 2, 335 grams of methanol, 6 grams of 50 percent aqueous calcium chloride and 370 grams (10.0 equivalents) of calcium hydroxide are processed to yield a carbonated barium-calcium sulfonate complex showing the following analyses.

| | |
|---|---|
| Basic number | 5.0 |
| Percent sulfate ash | 47.62 |
| Percent barium | 20.49 |
| Percent calcium | 3.74 |
| Metal ratio | 14.1 |

The carbonated barium-calcium sulfonate complexes produced in accordance with the present invention can be employed in lubricants (including liquid lubricants and bodied lubricants such as greases) for use in the crankcases, cylinders, transmissions, gears, chassis, torque converters, etc., of automotive equipment, industrial machinery, and marine diesel engines. Other suitable uses for the complexes are in asphalt emulsions, insecticidal compositions, stabilizing agents for plasticizers and plastics, paints, rust-inhibiting compositions, slushing oils, pesticides, foaming compositions, cutting oils, metal drawing compositions, flushing oils, textile treatment compositions, tanning compositions, metal cleaning compositions, emulsifying agents, antiseptic cleansing compositions, penetrating oils, hydraulic oils, gum solvent compositions, fat-splitting compositions, bonding agents for ceramics and asbestos, asphalt improving agents, flotation agents, improving agents for hydrocarbon fuels such as gasoline, fuel oil, gas oil, etc.

More particularly, the complexes of this invention are adapted for use in lubricants, paints, and plastics, especially halogen-bearing plastics. In these applications, the complex will be employed in the following concentrations based upon the weight of the total composition. For the preparation of lubricants, a minor proportion, generally from about 0.01 to about 40 percent, of the complex of this invention will be blended with a major proportion of the lubricating oil base, which base may contain one or more known additives. In some instances, the lubricating oil base may be a water and oil emulsion such as is used in the lubrication of low speed marine diesel engines.

| | Complex of This Invention | | |
|---|---|---|---|
| | Broad Range, Percent | Usual Range, Percent | Preferred Range, Percent |
| Lubricants | 0.01–40 | 0.2–30 | 0.5–20 |
| Stabilizing agent for plastics | 0.05–5 | 0.1–3 | 0.2–2 |
| Paint drier | 0.2–25 | 0.5–20 | 1.0–15 |

The lubricating oil base is generally a mineral oil having a Saybolt viscosity within the range from about 75 seconds at 100° F. to about 250 seconds at 210° F. It can, however, be a synthetic oil such as a polymerized polyisobutene, polymerized cracked paraffin waxes, dioctyl adipate, dioctyl sebacate, etc., or a naturally-occurring vegetable or animal oil.

Know lubricant additives can also be used, as indicated, in combination with the complexes of this invention. Such known additives include, for example, barium, calcium, lead, zinc, and nickel diorgano phosphorodithioates; phosphorus sulfide-treated olefins; sulfurized and sulfur chloride-treated olefins; alkylphenolates; alkylphenolate sulfides and disulfides; phenolates of phenolaldehyde condensation products; amines such as para-aminophenol, N-alkylated phenylene diamines, and anthranilic acid and esters thereof; metal salts of phosphorus pentasulfide-treated polyethylenes, polypropylenes; polyisobutenes, etc.; hindered phenols such as 2,6-di-tertiary-butyl-4-methyl-phenol and 4,4'-methylene bis-(2,6-di-tertiary-butylphenol); organoboron compounds such as borate esters and boric acid-treated amines, amides, and imides; phosphites and phospates such as di-(4-methyl-2-pentyl)phosphite, dioleyl phosphite, disperm alcohol phosphite, tricresyl phosphate, etc.; foam-inhibiting silicones such as polymerized dimethyl silicones; pour depressants such as wax-alkylated naphthalene, polymerized acrylate and/or methacrylate esters, etc.; oiliness agents such as lard oil, oleic acid, oleic acid amide, glyceryl dioleate, etc.; viscosity index improvers such as polymerized isobutenes, polymerized acrylate and/or methacrylate esters, etc.; extreme pressure agents such as substituted and unsubstituted hydrocarbon sulfides and polysulfides, halogenated aliphatic and cycloaliphatic compounds such as chlorinated paraffin waxes containing 20–75 percent chlorine, chlorinated eicosane containing 40–80 percent chlorine, chlorinated cyclohexane containing 20–70 percent chlorine, and sulfurized esters such as sulfurized methyl oleate, sulfurized glyceryl trioleate, sulfurized sperm oil, etc.; ashless dispersants such as vinyl pyrollidone-alkyl acrylate or methacrylate copolymers, vinylpyridine-alkyl acrylate or methacrylate copolymers, and reaction products of polyisobutene-substituted succinic anhydride with alkylene amines and, optionally, boron-containing compounds, in which reaction products the polyisobutene substituent contains at least about 50 carbon atoms; dithiocarbamic acid esters and salts; xanthic acid esters and salts; and other known lubricant additives.

Especially useful in combination with the sulfonate complexes of this invention in lubricants are minor proportions, generally from about 0.05 to about 8 percent by weight based on the total lubricant, of zinc dihydrocarbyl phosphorodithioates, phosphorus pentasulfide-treated terpenes, or alkaline earth metal alkylphenolate sulfides.

The zinc dihydrocarbyl phosphorodithioates useful herein possess the following structure

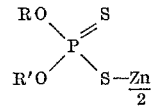

in which R and R' are each hydrocarbyl radicals containing from one to about 40 carbon atoms such as alkyl, alkenyl cycloalkyl, cycloalkenyl, aralkyl, alkaryl, and aryl radicals. Specific examples of R and R' include methyl, ethyl, n-propyl, isopropyl, isobutyl, n-butyl, isoamyl, n-amyl, neopentyl, n-hexyl, 4-methyl-2-pentyl, heptyl, n-octyl, isooctyl (i.e. diisobutyl), decyl, dodecyl, tridecyl, cetyl, oleyl, paraffin wax, octenyl, cyclohexyl, methylcyclohexyl, methylcyclohexenyl, benzyl, phenethyl, tolyl, cresyl, para-tertiary butylphenl, para-tertiar amylphenyl, isooctylphenyl, amylnaphthyl, phenanthryl, etc. To insure sufficient oil solubility, the zinc dihydrocarbyl phosphorodithioate should contain a total of at least about 7 carbon atoms in R plus R'. Such hydrocarbyl radicals may be the same or different radicals just so long as they contain, as indicated, a total of at least about 7 carbon atoms for reasons of oil solubility. Particularly effective zinc dihydrocarbyl phosphorodithioates in which R and R' are different are described in Goldsmith U.S. Patent 2,838,55 and Higgins et al. U.S. Patent 3,000,822. It is intended that the disclosure of said patents be considered as forming a part of the present specification.

Specific examples of zinc dihyrocarbyl phosphorodithioates which are useful in combination with the herein-described carbonated barium-sulfonate complexes in lubricants are as follows: zinc di-(4-methyl-2-pentyl)phosphorodithioate, zinc di-isooctyl phosphorodithioate, zinc di-isononyl phosphordithioate, zinc dilauryl phosphorodithioate, zinc dihydrocarbyl phosphorodithioate derived from a commercial mixture of $C_{12}$–$C_{14}$ branched alcohols, zinc 4-methyl-2-pentyl isopropyl phosphorodithioate, zinc dihydrocarbyl phosphorodithioate derived from a 60:40 mole-percent mixture, respectively, of di-(4-methyl-2-pentyl)phosphorodithioic and diisopropyl phosphorodithioic acids, zinc dihydrocarbyl phosphorodithioate derived from a 65:35 mole-percent mixture, respectively, of isobutyl and mixed primary amyl alcohols, zinc di-(tertiary-butylphenyl)phosphorodithioate, zinc di-(isooctylphenyl)phosphorodithioate, zinc isobutyl tertiary-amylphenyl phosphorodithioate, zinc di-(methylcyclohexyl) phosphorodithioate, zinc phenethyl lauryl phosphorodithioate, zinc di-eicosyl phosphorodithioate, zinc di-n-octadecenyl phosphorodithioate, zinc di-($C_{24}$–$C_{26}$ paraffin wax)phosphorodithioate, zinc phenyl tetradecyl phosphorodithioate, etc.

Phosphorus pentasulfide-treated terpenes useful for the purpose of this invention are prepared by heating one mole of phosphorus pentasulfide with 2 to 6 or more moles, preferably 3 to 5 moles, of a terpene or terpene mixture such as, e.g., alpha-pinene, beta-pinene, turpentine, limonene, dipentene, fenchene, menthadiene, etc. The reaction is generally carried out over a period of 0.5 to 6 hours at a temperature above about 80° C., generally 100°–150° C., and in most cases it is preferred to employ a low viscosity mineral oil as a reaction solvent. Thus, for example, a mixture of 680 grams (5 moles) of beta-pinene, 222 grams (1 mole) of phosphorus pentasulfide, and 902 grams of SAE 10 mineral oil is heated for 3 hours at 100°–140° C. to prepare a 50 percent oil solution of a terpene-phosphorus pentasulfide reaction product which is useful in lubricants of the present invention. Additional examples of known, useful terpene-phosphorus pentasulfide reaction products are to be found in U.S. Patent Nos. 2,356,073; 2,356,074; 2,379,312; 2,392,252; 2,416,281; and 2,486,188.

Alkaline earth metal alkylphenolate sulfides useful for the purposes of the present invention conform for the most part to the formula

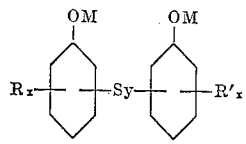

wherein M is one equivalent of an alkaline earth metal such as calcium, barium, strontium, or magnesium; R and R' are the same or different alkyl radicals, each containing from one to 100 or more carbon atoms; and $x$ and $y$ are numbers from 1 to about 4. In most instances, M is calcium or barium, R and R' are $C_4$–$C_8$ branched-chain alkyl radicals, $x$ is 1, and $y$ is 1 or 2. Such alkylphenolate sulfides are well-known in the lubricant art as shown by U.S. Patent Nos. 2,362,289 through 2,362,293, inclusive. Specific examples of alkaline earth metal alkylphenolate sulfides useful herein include calcium tertiary-amylphenolate monosulfide and disulfide, calcium isooctylphenolate monosulfide and disulfide, barium nonylphenolate monosulfide, barium polyisobutene-substituted phenolate monosulfide wherein the polyisobutene substituent contains an average from 20 to 65 carbon atoms, strontium tertiary-butylphenolate monosulfide, and the calcium phenolate monosulfide prepared by treating a heptylphenol-formaldehyde condensation product with sulfur dichloride and then with calcium hydroxide.

To illustrate better the wide variety of uses to which the barium-calcium sulfonate complexes of this invention are adapted, the following specific examples are presented.

| Use in a lubricant: | Percent |
|---|---|
| SAE 30 motor oil | 96.0 |
| Product of Example 14 | 3.0 |
| $P_2S_5$-treated turpentine [1] | 0.25 |
| Zinz dioctyl phosphorodithioate | 0.75 |
| SAE 20 motor oil | 92.5 |
| Product of Example 17 | 5.0 |
| Calcium isooctylphenolate monosulfide | 2.5 |

| Use as a stabilizing agent for halogen-bearing plastics: | |
|---|---|
| Polyvinyl chloride (55% chlorine) | 70.0 |
| Dioctyl phthalate | 28.75 |
| Product of Example 16 | 1.25 |

| Use as a paint drier: | |
|---|---|
| Titanium-base house paint | 97.0 |
| Product of Example 18 | 3.0 |

[1] 1 mole of $P_2S_5$ and 4 moles of turpentine heated for 4 hours at 140° C.

The basic numbers and acid numbers set forth in this specification were determined in accordance with ASTM procedure D974–58T. Likewise, the term "substantially neutral" as used herein refers to a material which is found to be substantially neutral by means of said ASTM procedure.

What is claimed is:

1. A process for preparing a carbonated barium-calcium sulfonate complex having a metal ratio of at least 10 which comprises preparing and mixing a mass in which, at 50° C., at least 50 percent of the components are in the liquid state, and in which mass the active components consist of:
    (A) a sulfonate selected from the group consisting of oil soluble sulfonic acids having a total of at least about 15 carbon atoms and the barium salts thereof;
    (B) a phenolic compound selected from the group consisting of phenols and the barium salts thereof; the equiavlents of A:B being in the range from about 1:10 to about 10:1;
    (C) a barium base, in an amount such that there is present in the mass a total of at least about 3 equivalents of barium per equivalent of A, and
    (D) water, in an amount equal to at least about one-tenth mole per mole of C;
maintaining the mass at a temperature and for a period of time sufficient to drive off substantially all water which may be present, and form a barium sulfonate complex; treating said barium sulfonate complex with carbon dioxide in an amount sufficient to liberate a substantial proportion of said phenol of B; mixing said carbon dioxide-treated barium sulfonate complex with:
    (E) a calcium base, in an amount such that there is present in the mass a total of at least about 10 equivalents of barium and calcium per equivalent of A;
    (F) a lower aliphatic monohydric alcohol, in the amount of at least about 5 percent by weight of said carbon dioxide-treated barium sulfonate complex;
and then treating the mixture with carbon dioxide and heating it to drive off substantially all the lower alcohol and any water present.

2. A process in accordance with claim 1 further characterized in that a minor amount of a calcium halide is added to the mixture of said carbon dioxide-treated barium sulfonate complex, calcium base, and alphatic monohydric alcohol.

3. A process in accordance with claim 2 further characterized in that the calcium halide is calcium chloride.

4. A process in accordance with claim 1 further characterized in that the sulfonate of A is a barium petroleum sulfonate.

5. A process in accordance with claim 1 further characterized in that the sulfonate of A is a barium mahogany sulfonate.

6. A process in accordance with claim 1 further characterized in that the sulfonate of A is a barium brightstock sulfonate.

7. A process in accordance with claim 1 further characterized in that the sulfonate of A is a barium alkaryl sulfonate.

8. A process in accordance with claim 1 further characterized in that the sulfonate of A is a barium dodecylbenzene bottoms sulfonate.

9. A process in accordance with claim 1 further characterized in that the phenolic compound of B is a monoalkylphenol.

10. A process in accordance with claim 1 further characterized in that the phenolic compound of B is heptylphenol.

11. A process in accordance with claim 1 further characterized in that the barium base of C is barium oxide.

12. A process in accordance with claim 1 further characterized in that the calcium base of E is calcium hydroxide.

13. A process in accordance with claim 1 further characterized in that the lower aliphatic monohydric alcohol of F is methanol.

14. A product prepared in accordance with the process of claim 1.

15. A lubricant comprising a major proportion of a lubricating oil and a minor proportion of a product prepared in accordance with the process of claim 1.

16. A lubricant comprising a major proportion of the lubricant of claim 15 and a minor proportion of a zinc dihydrocarbyl phosphorodithioate in which each hydrocarbyl radical contains from 1 to about 40 carbon atoms.

17. A lubricant comprising a major proportion of the lubricant of claim 15 and a minor proportion of a phosphorus pentasulfide-treated terpene.

18. A lubricant comprising a major proportion of the lubricant of claim 15 and a minor proportion of an alkaline earth metal alkylphenolate sulfide.

References Cited in the file of this patent

UNITED STATES PATENTS

| | | |
|---|---|---|
| 2,681,315 | Tongberg et al. | June 15, 1954 |
| 2,723,234 | Asseff et al. | Nov. 8, 1955 |
| 2,744,083 | Moody et al. | May 1, 1956 |
| 2,791,558 | Schuessler et al. | May 7, 1957 |
| 2,881,206 | Kjonaas et al. | Apr. 7, 1959 |
| 2,902,448 | Collins | Sept. 1, 1959 |
| 2,991,246 | Kleinholz | July 4, 1961 |
| 3,014,866 | Fern | Dec. 26, 1961 |
| 3,046,224 | Andress | July 24, 1962 |